United States Patent [19]

Lin et al.

[11] 4,265,066

[45] May 5, 1981

[54] PRESTRESSED CONCRETE PRESSURE VESSELS

[75] Inventors: Tung-Yen Lin, El Cerrito; Yue-Chyou Yang, San Francisco; Philip Y. Chow, Orinda, all of Calif.

[73] Assignee: T. Y. Lin International, San Francisco, Calif.

[21] Appl. No.: 4,742

[22] Filed: Jan. 19, 1979

Related U.S. Application Data

[63] Continuation-in-part of Ser. No. 789,634, Apr. 21, 1977, abandoned.

[51] Int. Cl.³ .............................................. E04C 3/26
[52] U.S. Cl. .......................................... 52/224; 176/87
[58] Field of Search .............. 52/224, 225, 226, 249, 52/248; 176/87, 38

[56] References Cited

U.S. PATENT DOCUMENTS

| 3,237,358 | 3/1966 | Harris | 52/224 |
|---|---|---|---|
| 3,293,139 | 12/1966 | Belliev | 52/224 |
| 3,371,017 | 2/1968 | Coast et al. | 52/224 |
| 3,486,978 | 12/1969 | Ldterlox et al. | 176/87 |
| 3,568,384 | 3/1971 | Craset et al. | 176/87 |
| 3,788,944 | 1/1974 | Strake et al. | 176/87 |
| 3,793,143 | 2/1974 | Maller | 176/87 |
| 3,893,270 | 7/1975 | Schupack | 176/87 |
| 3,899,391 | 8/1975 | Sulzer | 176/87 |
| 3,930,943 | 12/1976 | Michel | 176/87 |
| 4,032,402 | 6/1977 | Horner et al. | 52/224 |
| 4,045,285 | 8/1977 | Baungaertner | 176/87 |
| 4,045,289 | 8/1977 | Seidensticker | 176/87 |

FOREIGN PATENT DOCUMENTS

| 67327 | 8/1948 | Denmark | 52/224 |
|---|---|---|---|
| 1306797 | 11/1961 | France | 52/224 |
| 1420243 | 1/1965 | France | 52/224 |
| 1488453 | 6/1966 | France | 52/224 |

OTHER PUBLICATIONS

"The multicavity PCRV", Nuclear Engineering International pp. 652–655.

Primary Examiner—James A. Leppink
Assistant Examiner—Henry E. Raduazo
Attorney, Agent, or Firm—Owen, Wickersham & Erickson

[57] ABSTRACT

A prestressed concrete pressure-containment vessel having one or more cavities within its external shell. The cavities, whether cylindrical or other shape, are totally contained by prestressing tendons, which apply forces to contain various pressures within the structure. By permitting and actually inducing controlled cracking of the vessel in the outer portions of the thick shell wall, one embodiment of a pressure-containment vessel relieves stresses and enhances resistance to very high internal pressures and to stresses due to high internal temperatures and steep temperature gradients.

12 Claims, 11 Drawing Figures

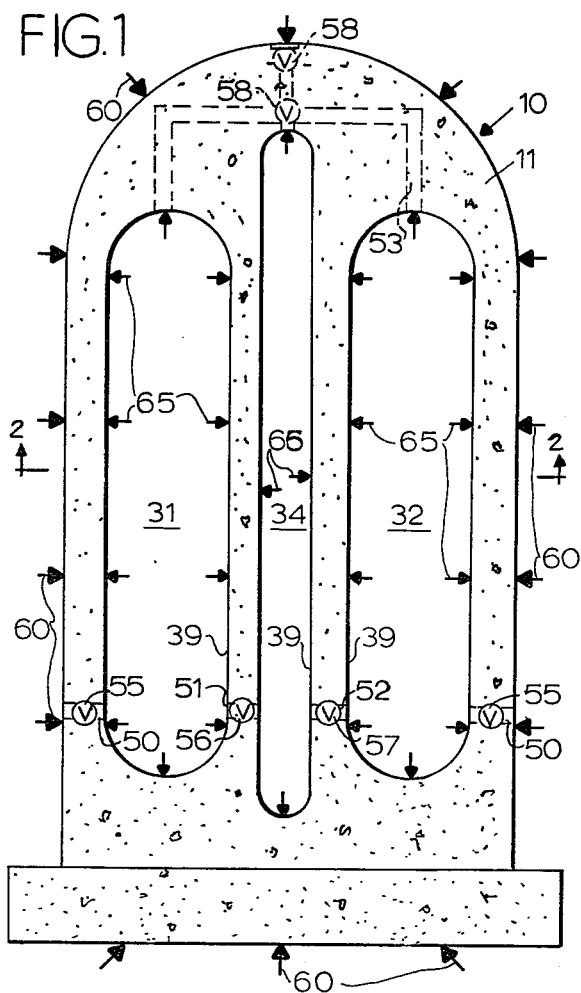
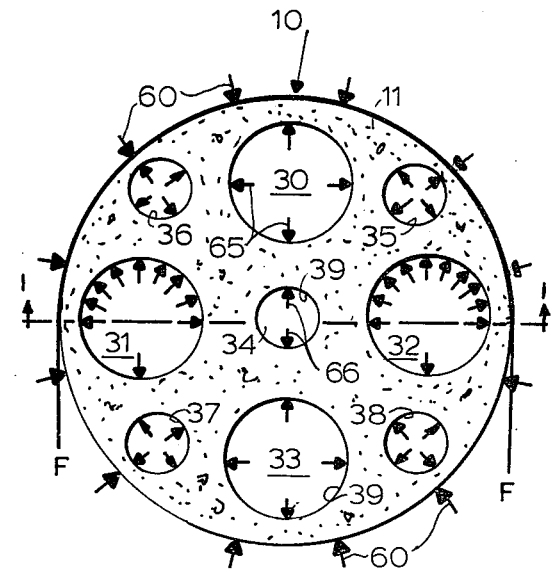
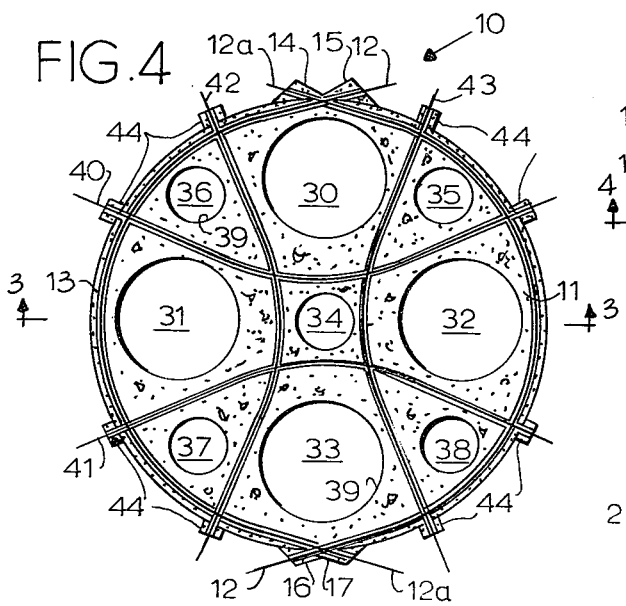
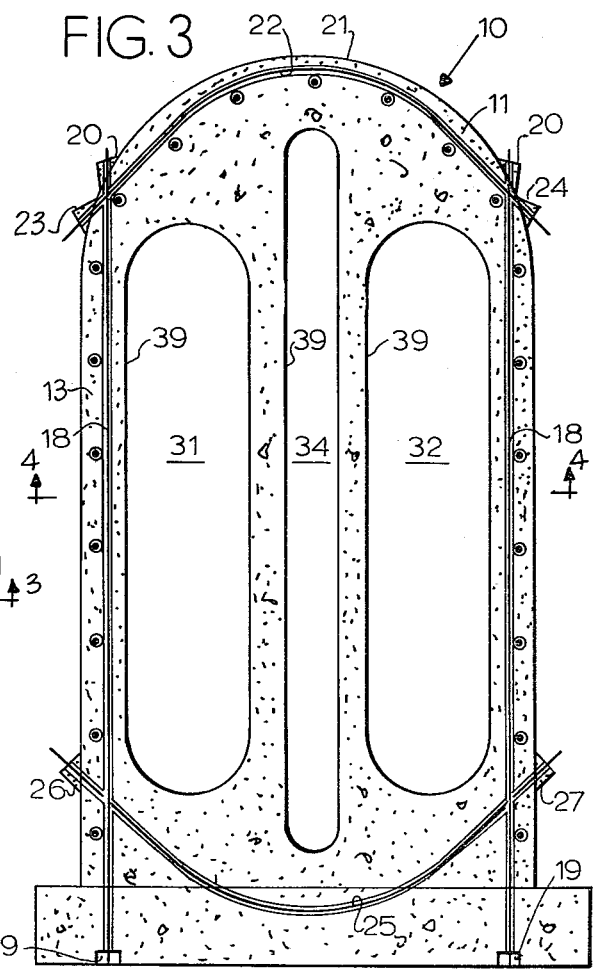

//4,265,066

PRESTRESSED CONCRETE PRESSURE VESSELS

REFERENCE TO RELATED APPLICATION

This application is a continuation-in-part of application Ser. No. 789,634, filed Apr. 21, 1977 and now abandoned.

BACKGROUND OF THE INVENTION

This invention relates to a prestressed, post-tensioned concrete pressure-containment vessel which contains one or more cavities subjected to unusually high pressures within the confinement of the prestressing force. It also relates to a method for constructing such a vessel, which may be according to new design criteria which provide for the containment of higher internal pressures and temperatures.

Pressure-containment vessels for pressures up to the order of 1,000 p.s.i. and using prestressed concrete construction have been constructed for various purposes such as nuclear power containment, water, and oil tanks. Usually there has been only a single cavity contained by the external vessel walls, although some such vessels have included several cavities. One aspect of the present invention centers on a provision of more than one cavity within a container and a relationship such that internal pressures exerted by the various cavities neutralize one another, thereby making the vessel and the entire containment much more economical. It also includes the addition of internal tendons or bars, which further strengthen the local conditions as required.

An important object of the present invention is to provide pressure containment vessels which can withstand high pressures in large multiple cavities, which would otherwise have to be built and contained separately.

Another important object is to provide a method for prestressing and reinforcing such vessels, both externally and internally, that will significantly reduce the cost of these structures.

Another object is to provide a vessel which will contain the various pressure cavities required for the processing of energy production and materials conversion, so that the heat and energy loss can be minimized by virtue of having all the heat exchange contained within a single vessel, thereby enabling the efficient tapping of heat energy, as by a cooling system associated with the vessel, to be utilized as a source of power.

Another object is to effectively increase the pressure and temperature-retaining capability of a precast concrete vessel by using a new set of design criteria which include the encouragement and actual inducement of cracking, on a controlled basis, at preselected locations in the outer portions of the thick vessel wall.

A concrete vessel of this invention may be constructed from either precast concrete or in-place concrete, or from a combination thereof. It is totally contained by prestressing tendons that apply forces containing the pressures within the vessel. It may be additionally reinforced with internal post-tensioned tendons, as well as reinforcing bars. Inside the vessel is a plurality of cores or cavities, which may be of cylindrical or any other form and which are contained by the overall external prestressing, with the help of the internal tendons and/or reinforcements, preferably of steel.

The form of the concrete vessel may be spherical, cylindrical, octagonal, hexagonal, rectangular or any other shape or combination. The ends of the concrete vessel can be flat, semi-spherical, ellipsoidal, paraboloidal, pyramidal, or any other shape or combinations, so as to meet the requirement of functional capabilities and prestressed tendon arrangement. The number, size, location, and shape of the hollow cores can be varied at will, and they may be connected by necessary piping or tunnels within the vessel, as desired.

A multiple-cavity integrated pressure vessel according to the invention has several essential features.

First, the pressures of the various hollow cores inside the vessel are utilized to act against one another and, therefore, to neutralize their forces so that only one global set of prestressed tendons is required around the outside of the concrete vessel. The concrete casing under compression absorbs the pressure from the tendons when the cores are not pressurized, and that compression is partly released when resisting internal pressure. In order to control internal stresses produced by irregular patterns of arrangement of the interior cores, additional prestressed tendons or non-prestressed reinforcements can be located within the vessel, terminating either within the vessel or at the exterior facade of the vessel.

A second basic feature of this integrated vessel is the simplification, and hence the economy, of the piping and other connections required to connect the cores. By locating all these cores and their piping within one vessel, they become cylinders or tunnels in the vessel, and need not be separately contained for pressure-resisting. The multiple areas of interface between the external atmosphere and between the individual cores, pipes, and connections, are thereby reduced to a single facade around the periphery of the entire concrete vessel or block.

The concrete block forming the vessel may be prestressed and confined in three dimensions, so that the strength of its concrete is increased by three to five times the ordinary unconfined strength of concrete. For example, concrete having a normal strength of 5,000 p.s.i. can, in this invention resist a compressive stress of 20,000 p.s.i. In fact, it is difficult to visualize an ultimate failure of concrete within this exterior confinement. It is understood that the plastic flow of concrete within that block (when subject to extremely high compressive stresses) must be taken into account.

The basic weakness of concrete in tension can be overcome, according to one aspect of the present invention, by three-dimensional precompression produced by the tendons. This three-dimensional precompression is in sharp contrast to the one or two-dimensional precompression usually obtained for single-cavity prestressed concrete vessels.

The design and analysis of such a vessel subjected to external prestressing by the tendons, by internal pressure from the cores, and by effects of additional steel within the vessel should be accomplished by careful physical and mathematical analyses. Such analyses, using available general computer programs or particular computer programs, should take into account the shrinkage and creep effects, as well as the elastic and plastic behavior of concrete and steel subject to the given environmental and artificially produced conditions. The effects of temperature changes, resulting in temperature gradient and material property alterations of the concrete and steel result in resisting such effects as are accounted for by the external prestressing, and this is a tremendous asset to that design.

In order to control the heat and heat transfer of the thermal reactions within the cores, it may be necessary or advisable to install cooling or heating systems around the cores and in fact throughout the vessel as required. The heat gain or loss from these thermal control systems may then be utilized to produce energy within or outside the vessel.

Access to the various cores and pipes within the vessel, for the purpose of inspection and repair, can be suitably located so as to minimize stress concentration and to facilitate maintenance and operation. Such accesses will be reinforced and strengthened as required.

Lining of the cores and pipes for various reasons, such as controlling penetration, refraction or temperatures, can be provided by metals, ceramics, or plastics. But the pressure-containing effect is essentially provided by the exterior prestressing and by the additional concrete or steel within the core, utilizing the large increase in concrete strength when concrete is so confined.

The applications of these integrated vessels are specially desirable for energy-producing or converting systems, including oil, gas, coal, nuclear, solar, geothermal, and others. The exterior appearance of these concrete vessels can be suitably decorated, or they can be sunk partly or totally into the ground, ocean, or other water, as may be the case. In fact, when sunken in deep water, the external waterhead can be utilized as part of the global post-tensioning.

An important feature of a prestressed concrete pressure vessel (PCPV) according to a second embodiment of the invention is to overcome the inherent weakness of concrete in tension, by permitting and actually inducing controlled tension cracking. The tension cracks are introduced where the structural integrity of the PCPV is not impaired, i.e., the external regions of the vessel wall. The vessel wall is generally cast considerably thicker for this type PCPV. For a wall thickness of ten feet or more, the penetration of cracks to about half the wall thickness, for example, will not be detrimental in the function, safety or durability of the PCPV for the purpose for which it is designed. A PCPV designed according to this second embodiment of the invention is capable of containing higher pressure, under higher temperature, than previous PCPV's because of the relieving of many stresses due to the permitted, controlled cracking and because of the manner in which the prestressing tendons are arranged within the vessel.

DESCRIPTION OF THE DRAWINGS

In the drawings:

FIG. 1 is a somewhat diagrammatic view in elevation and in secton of an integrated multiple-cavity prestressed concrete pressure vessel embodying the principles of a first embodiment of the invention with the forces indicated by arrows.

FIG. 2 is a view in section taken along the line 2—2 in FIG. 1, and again showing arrows to represent forces.

FIG. 3 is a view similar to FIG. 1 showing the placing of the principal primary prestressing tendons.

FIG. 4 is a view in section taken along the line 4—4 in FIG. 3 and showing both some principal and secondary prestressing tendons.

DETAILED DESCRIPTION OF THE PREFERRED EMBODIMENTS

Figure 5:
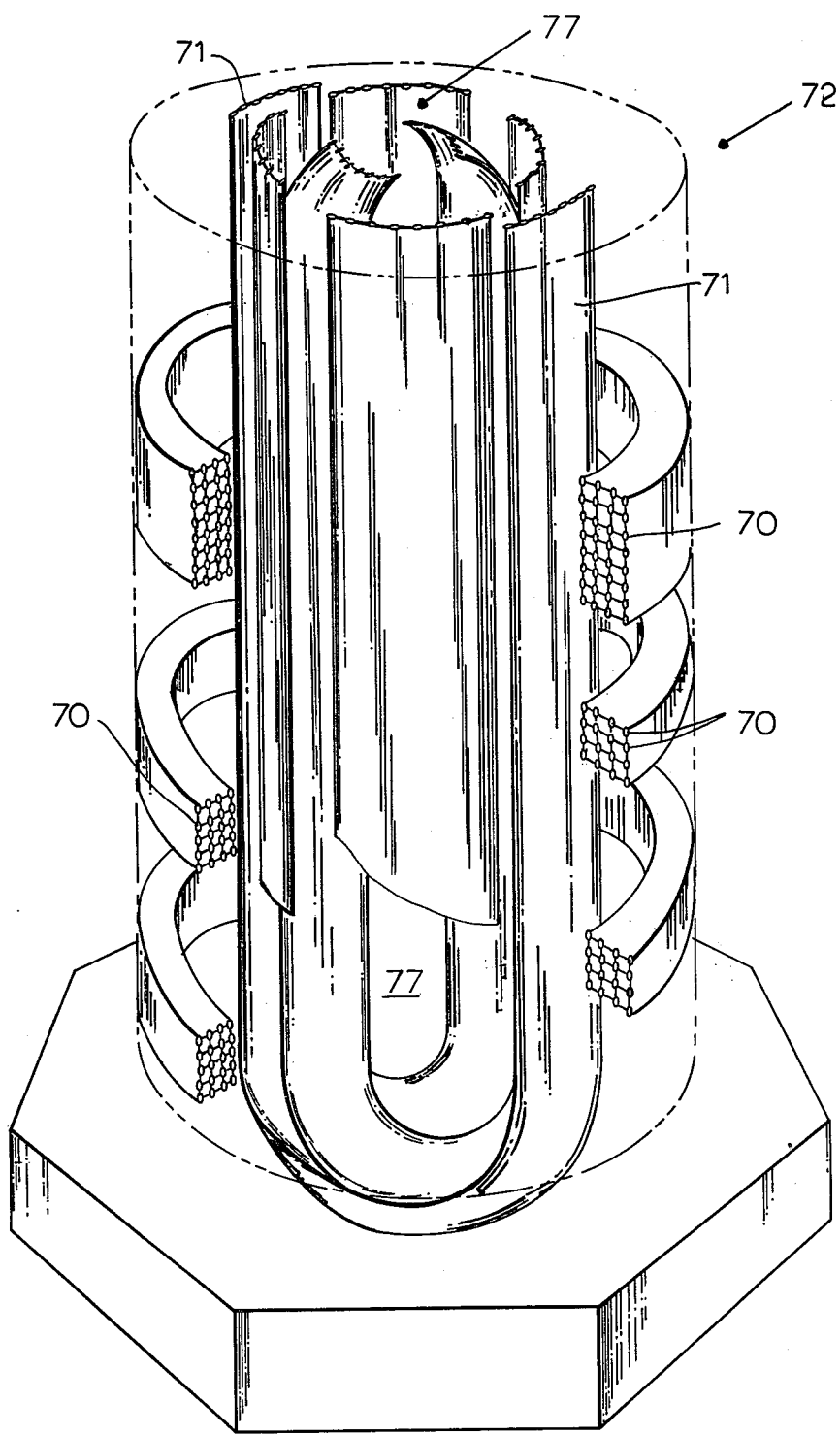
FIG. 5 is a schematic isometric view of a pressure vessel embodying principles of a second embodiment of the invention, with only a few of the circumferential tendons shown, the vertical gaps between groups of such tendons not indicating actual gaps but simply enabling a clearer reading of the drawings, while only a few of the vertical tendons and only some of one group of them are shown, to show the general type of their disposition in relation to one of the interior cavities, in particular a central cavity.

FIGS. 1–4 show one preferred embodiment of the invention, a pressure vessel 10. It should be understood from the outset that such a pressure vessel 10 is of immense size, typically perhaps 200-feet high and 80-feet in diameter. Of course, it may be smaller or larger than this amount, but this scale will indicate what is involved. The principal structural material of the pressure vessel 10 is concrete 11, which may be reinforced by non-prestressed rods which are not shown, since they are not always essential and since they might obscure the basic concept, although they are preferably present, being emplaced according to normal practice.

As shown in FIGS. 3 and 4, a very important feature of the invention is the use of horizontal primary prestressing tendons 12, which lie near the surface 13 and are present in sufficient numbers and suitable spacing to encircle the pressure vessel 10 at intervals easily calculated, relatively near the outside surface 13. Thus, as can be seen in FIGS. 3 and 4, there may be at each level, a pair of tendons 12 and 12a and a set of four anchors 14, 15, 16, and 17. One tendon 12a is anchored to the anchors 14 and 16 and the other tendon 12 at that level is anchored to anchorages 15 and 17. There are also vertical primary tendons 18, also located near the surface around the perimeter of the vessel 10. The tendons 18 may be anchored at the bottom at an anchorage 19 and also to an upper end anchorage 20. There may also be intermediate anchorages, if the structure 10 is too high for the use of a single tendon 18 for the entire height.

The structure 10 is shown as cylindrical, but other shapes are quite practical. It is shown, by way of example, having a dome 21 with prestressing primary tendons 22 that arch over the dome and are secured to anchorages 23 and 24, for example. There may also be a set of bottom prestressing tendons 25 with anchorages 26 and 27.

example, of concrete vessel walls for use as nuclear power plants has been determined heretofore more by the shielding of the radioactivity of the process than for structural considerations, and therefore a wall thickness of three or four feet for a prestressed concrete secondary containment vessel has been common. Heretofore, cracks and therefore tension in the concrete, have not been permissible because of the danger of seepage of radioactive emissions.

In contrast, the pressure vessel of the present invention would require a wall thickness of over ten feet. Because of the unusually great thickness it is not possible to avoid high tensile strength stresses around the outer region of the vessel's wall. This is due in part to shrinkage and creep, and in part to a temperature gradient through the wall when the pressure vessel is in operation. The present invention includes acceptance of cracks, which are used to relieve high tensile forces, and thus makes it possible for prestressed concrete to be used effectively.

The invention includes the concept of purposely introducing cracks, or separations, in the vessel wall to relieve the high tensile stresses in areas where the structural integrity of the prestressed concrete pressure vessel is not thereby impaired. Such cracks may penetrate to perhaps one-fourth or even up to one-half the thickness of the wall, depending upon the ratio of the internal and the external radii of the vessel wall, the location of the various internal cavities in a multiple-cavity vessel, and the internal pressure intensity and temperature level. This means that there still remains in the wall a sizable portion of uncracked thickness, and the wall is therefore leaktight. The vessel is also able to withstand higher pressures, at higher temperatures, because of the relieving of tensile stresses under controlled cracking. This concept is developed on the basis of the serviceability of the vessel and also on its behavior and safety.

FIG. 5 illustrates the general plan of disposition of the horizontal and vertical tendons 70 and 71, respectively, in a PCPV according to this second embodiment of the invention, generally indicated as 72. The horizontal tendons 70 all consist of generally semicircular paths (compare FIG. 7) of a plurality of tendons along a common plane.

For example, in a 300-foot high tower the horizontal groups of tendons 70 may be spaced apart vertically about every two feet. There can be fewer tendons in the groups at the upper and lower extremities of the device with more tendons in the central portions.

Figure 6:
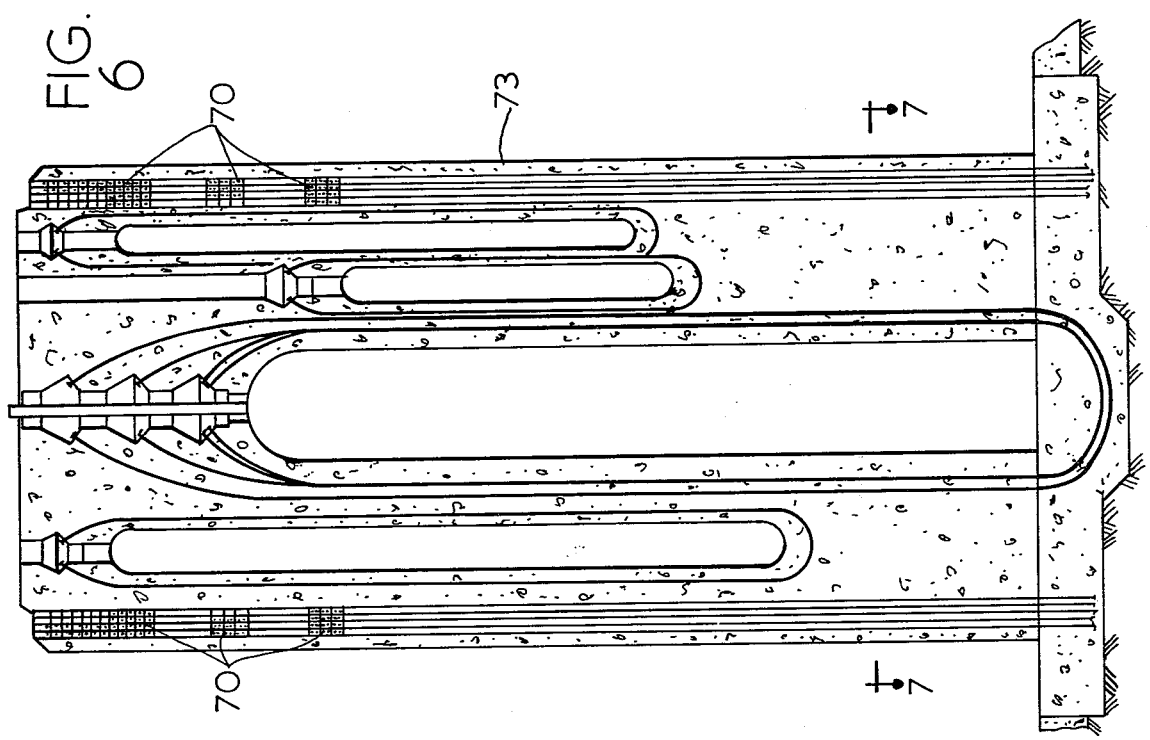
FIG. 6 is a simplified view in elevation and in section of the tower of FIG. 5, with four cavities shown, but with all of the vertical tendons omitted for the sake of clarity.

For example, in a tower somewhat over 200-feet high there may be in each two-foot space, two tendons parallel to each other embedded in the concrete near the top and also near the bottom, then for the next level down from the top and up from the bottom, there may be four tendons per row, then six tendons per row, then in the central portion of the tower, eight tendons per row. This is partially illustrated in FIG. 6, and also in FIG. 10. In the drawing of FIG. 5, they are shown as four tendons per level simply to illustrate the general arrangement. The arrangement of the numbers of tendons per row will vary according to the arrangement and design pressure and temperature of the various internal cavities of the vessel. The number of tendons per row may vary along the height of the vessel according to requirements.

Figure 7:
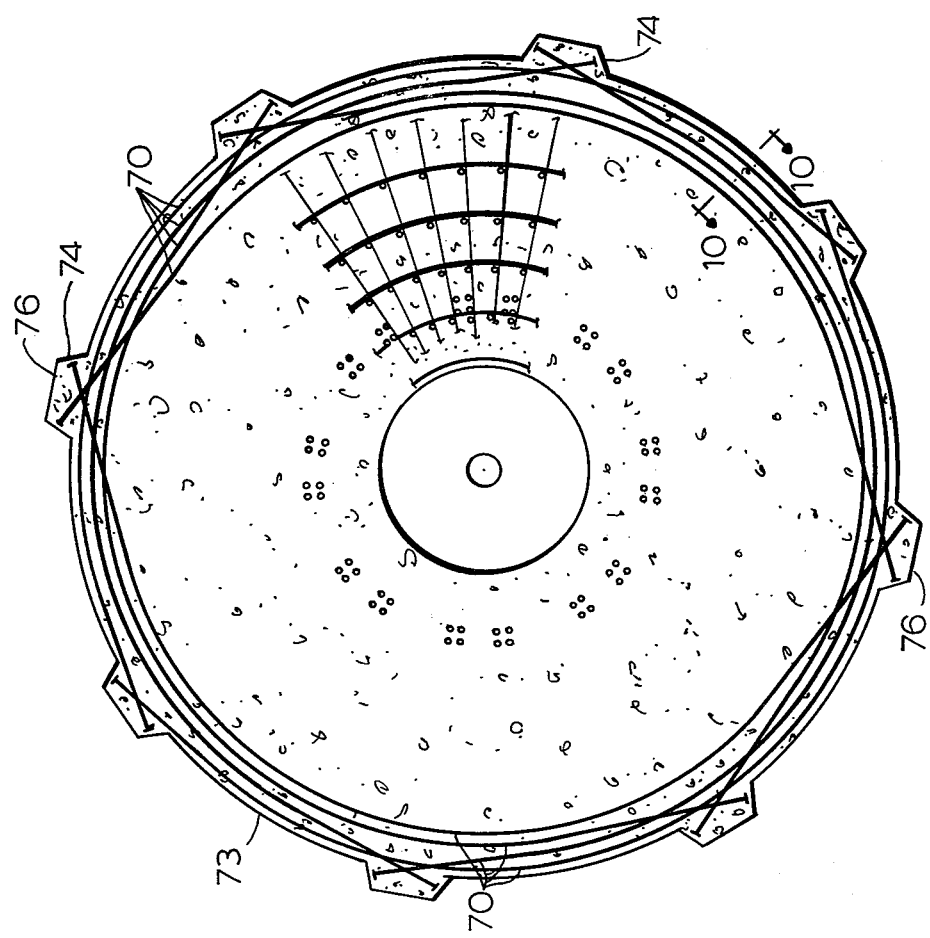
FIG. 7 is a diagrammatic and sectional view taken along the horizontal section 7—7 in FIG. 6 but on an enlarged scale, and showing some of the disposition of vertical tendons, as well as of horizontal tendons.

As shown in FIG. 7, each tendon preferably extends about halfway around the vessel wall 73, having anchors 74 at buttresses 76, extending out from the generally cylindrical structure. At these points, the tightening forces are applied. By staggering the anchor points 74 so that, for example, where there are four tendons 70 per layer, there are eight buttresses 76 with the tendons extending as shown, with overlap from one to the next, it is possible to obtain substantially even circumferential tension, which is what is desired.

FIG. 5 also illustrates in diagrammatic form one possible disposition of vertical tendons 71 in relation to one cavity 77. It is again stated that the tower 72 is very large and that the drawing is on a small scale and simplified, with no attempt made to show every tendon. In this case, the U-shaped vertical tendons 71 loop at the bottom of the structure. In other words, each comprises one long vertical run which curves at the bottom to come up diametrically opposite as another vertical run, as shown. These runs are spaced equally from the cavity 77 which they surround. Only one such pattern is shown in this particular drawing, but there could be many cavities, each one of them having the surrounding tendons substantially as shown in FIG. 5 so far as the pattern is concerned. An advantage of the U-shaped tendons is that they enable stressing from the top only, thereby simplifying the procedures and saving in costs. Ordinary straight vertical tendons must be stressed at both ends, both top and bottom, so that special stressing galleries have to provided. The U-shaped tendons of this embodiment of the invention avoids that necessity.

Figure 11:
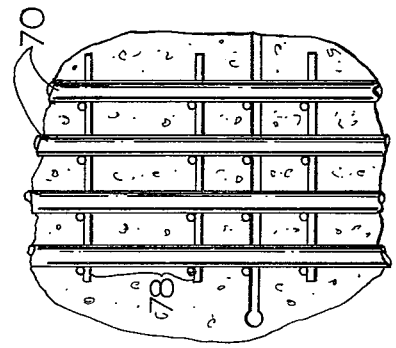
FIG. 11 is a view in plan section taken along the line 11—11 in FIG. 10, showing the horizontal spacing of the circumferential tendons.
Figure 10:
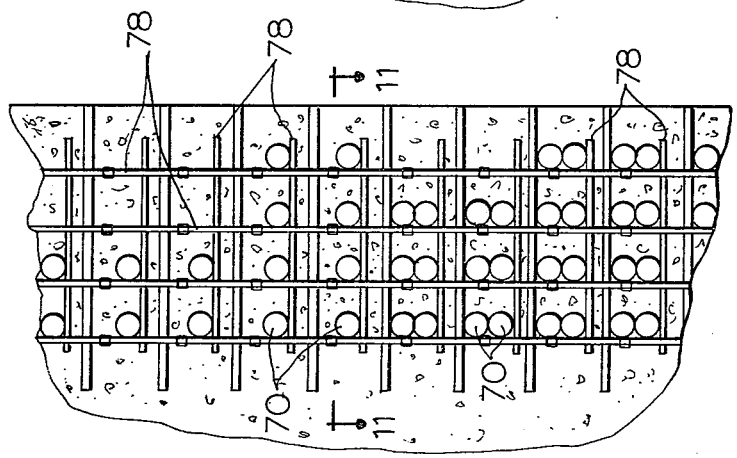
FIG. 10 is an enlarged fragmentary view in vertical section taken along the line 10—10 in FIG. 7, illustrating the disposition, support and spacing of the circumferential tendons along a vertical section.

FIGS. 10 and 11 show how the horizontal tendons 70 may be grouped as twos, threes, fours, sixes, and eights, with reinforcing rods 78 retaining their position during the pouring operation.

The individual tendons themselves are contained within ducts (not shown in detail) which may be metal or plastic members, as are well known in the prestressed concrete industry. For example, they could comprise a spiral winding forming a tube or sheath through which the tendons themselves pass. These tubes may be linked together, as shown diagrammatically in FIG. 5 in each layer.

Figure 8:
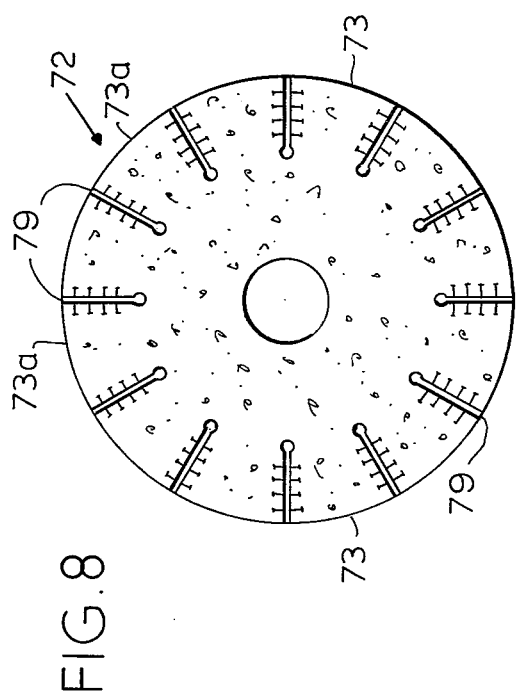
FIG. 8 is a diagrammatic view in horizontal section on the scale of FIG. 6, taken along the same section as FIG. 7 but primarily showing use of membrane separators to achieve controlled cracking in the pressure vessel.
Figure 9:
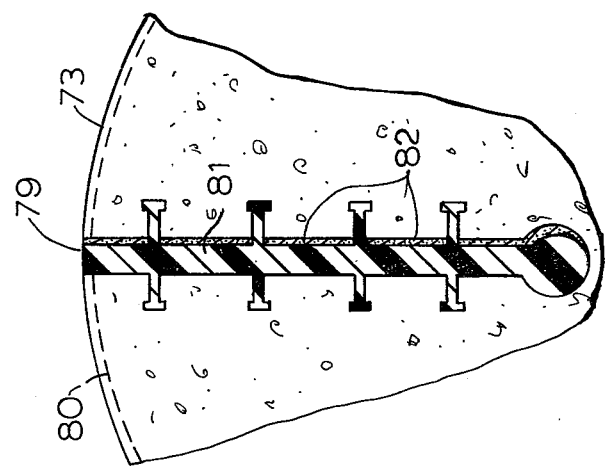
FIG. 9 is an enlargement of a portion of FIG. 8 showing how grout is used to fill in the preformed separation after it has opened farther under tension.

As discussed above, this embodiment of a prestressed concrete pressure vessel includes the concept of purposely induced controlled cracking in the outer regions of the very thick vessel wall, in order to relieve tensile stresses in this area and provide for containment of unusually high pressures and temperatures in the internal cavity of cavities. Thus, in FIGS. 8 and 9 a system of purposely introduced partings 79 between sections of the wall 73 is shown. A membrane 81, which may be made of plastic, bituminous felt, or other inert material, is introduced between the adjacent wall sections 73a; and as the concrete sets, the tendency then is to "crack" or open farther along these membranes 81 rather than between them. Later, under working stresses, when tension cracking would normally tend to occur, the preformed separations absorb the cracking tendency and merely open farther. Due to prestressing and the effect of the internal pressure and temperature, cracking is prevented from penetrating more deeply into the vessel wall. When the cracks have fully opened they may be filled later by removing the membranes and applying grout 82 in the resulting spaces, as shown in FIG. 9.

In a prestressed concrete pressure vessel including multiple internal cavities and employing the principles of this embodiment of the invention (not specifically illustrated), smaller peripheral cavities may actually be located between the preformed separations 79, pro- Within the vessel 10 there are shown four main pressure vessel cavities shown as 30, 31, 32, and 33, and there is also a series of secondary cavities, which may be reaction chambers; in this instance, five such cavities 34, 35, 36, 37, and 38, are shown. There will be as many cavities as needed, some or all of them being sites of chemical reaction, or for storage, as desired. Each cavity is lined, as by thin metal lining 39. The purpose of the lining is to prevent seepage by porosity. No reliance is made on the lining 39 for strength. For some liquids the lining may be a stainless steel or good carbon steel or, in other instances, a different kind of steel. Other metals, other steel, and ceramics, and epoxies, etc., may be used where desired. The linings help to overcome the porosity which is characteristic of concrete itself and yet do not have to withstand any substantial amount of pressure themselves for that is taken up by the concrete, tendons, and reinforcing bars.

At intervals and in various paths, there may be secondary tendons. FIG. 4 shows four such tendons 40, 41, 42, and 43 with a series of identical anchorages 44 securing them. The secondary tendons 40, 41, 42, and 43 may be made to follow any desired path, the parabolic ones shown being only an example. It will be seen that the tendons run in between various of the cavities. At critical areas, additional reinforcing and prestressing steels (not shown) are used for local strengthening.

There may be suitably valved or hatched access tunnels which give access to the structure and to its cavities.

Suitable inlet and outlet conduits 50 may be provided, and also interior conduits 51, 52, and 53, either by shaping them directly in the concrete and providing suitable liners or by embedding relatively thin-walled pipes directly in the concrete. Each conduit has its appropriate valving, such as valves 55, 56, 57, and 58. The pipes do not have to stand the full force of the pressure exerted by the fluid since they are in snug contact with and are backed up by and supported by the concrete. The pipes, in effect, act as liners whether they are really pipes or not; and the concrete acts as the pressure-resisting medium, being itself able to do this because of the prestressing involved.

A contrast should be pointed out between what this invention offers and the alternatives. Up to now, what has been done basically has been to make the pressure vessels as separate metal members. They are made of very heavy and often expensive metal in order to resist the forces involved. When metal walls are an inch or more thick and in some cases several inches up to eight inches, the amount of metal involved becomes a tremendous cost consideration as well as the quality of work necessary to produce such pieces without weaknesses subject to damage from high pressures. Current manufacturing capabilities also put a limit to the thickness of steel plate, which, in turn, limits the size of the pressure vessel.

The pressures spoken of in this invention relate to 1,000 p.s.i. to 3,000 p.s.i.; although, of course, the vessel will certainly withstand lower pressures. Relatively high pressures can be easily taken care of in this invention by proper design according to known engineering principles.

The alternative structure, that is, the expensive metal containers and conduits necessary to accomplish what the present invention does, because of the material and the limited size of the vessel, tend to cost much more than a larger prestressed concrete structure. In effect, each one of these metal pressure vessels must stand as a barrier between the high pressure inside the container and the atmospheric pressure outside.

Another alternative structure would be ordinary reinforced concrete, and this has not been used simply because it is not a suitable material for pressure-retaining structures. Such structures made out of conventional reinforced concrete have never heretofore been seriously proposed because of the inherent handicap of conventional reinforced concrete, which derives its strength from strain. This means cracking through the entire thickness of the vessel wall.

In contrast to this, the prestressed concrete structures of this invention provide a relatively inexpensive way of building these expensive structures. The manufacture of concrete walls which are several feet thick is no problem and by prestressing the structure as a whole great strength can be incorporated into the concrete. It is easier to pour concrete walls several feet in thickness than to manufacture metal articles having walls several inches in thickness, and it is less expensive to do so.

Thus, a high-pressure multicavity structure can be made which includes the main containers, usually several of them, and subordinate containers which may be used in treatment processes or for additional storage, and the conduits which lead to and from the various containers in the pressure vessel provided with the usual valving, etc.

FIGS. 1 and 2 illustrate the forces that act on a pressure vessel of this type, and it will be seen that by virtue of the prestressing tendons and particularly the primary tendons 11, etc., there are large arrows 60 acting inwardly generally radially and also from the bottom upwardly generally from the earth itself. These oppose and resist the smaller forces 65 inside the major cavities and 66 inside the secondary cavities. The invention enables these forces to be substantially balanced by the prestressing.

As an example, consider a horizontal section of the cylinder having a diameter of 80 feet. FIGS. 1 and 2 having four primary cores, each twenty feet in diameter and sustaining, for example, an internal pressure of 1,200 p.s.i., and also having four secondary cores, each ten feet in diameter and sustaining an internal pressure of 800 p.s.i. A critical section 1—1, indicates the amount of prestress F required to balance the internal pressure. Based on laws of statics, we have:

$$2F = [1200 \text{ p.s.i.} (2 \times 20) + 800 \text{ p.s.i.} \times 10]$$
$$144/1000 \text{ kips (kip or k} = 1000 \text{ pounds)}$$
$$= [48 + 8] \, 144$$
$$F = 28 \times 144 = 4032 \text{k/ft. of wall height.}$$

This force F will be absorbed by the concrete when no internal pressure exists. Then the compressive stress in the concrete over a net width of 30 feet, will be.

$$2F/30 = 2 \times 4020 \text{k}/(30 \times 144) = 1.86 \text{ kips per square inch.}$$

Which is then checked against the strength of concrete under these confined conditions, which is considerably higher than the usual 5-kip cylinder strength. More refined analyses will, of course, be necessary; but this example illustrates the primary concept.

A prestressed concrete pressure vessel according to a second preferred embodiment of this invention is intended to retain very high pressures. The thickness, for vided the smaller cavities are spaced sufficiently far apart.

The existing codes relating to pressure vessels are not meant for thick-walled, high-pressure, high-temperature types of pressure vessels. A new set of criteria must be used which relates to serviceability, behavior and safety, rather than the stresses predicted as allowable when governed conventionally by elastic conditions. Many of the limitations heretofore used simply do not apply to a thick-walled vessel wherein neither creep nor local cracking may be significant; although they may be present. The old design criteria are inapplicable to the new situation created by the present invention.

Under the type of criteria applicable to the present invention, one of the most important considerations is an adequate factor of safety against failure, while insuring at the same time the proper behavior of the vessel under operating conditions including possible overpressure.

Under the action of prestress alone the membrane stress in the vessel may be set at a much higher value than is usually applied for nuclear containment vessels. The term "membrane stress" as used herein is the average stress across a critical section of a vessel, computed, for simplicity, across a two-dimensional section without considering the three-dimensional nature of the problem. The membrane stress is an important and convenient check on the gross factor of safety. Concrete nuclear containment vessels are usually limited to membrane compressive stress of about 1,500 p.s.i. Coal conversion vessels involve higher pressures and temperatures, and such vessels designed according to this invention have much thicker walls than concrete nuclear containment vessels, with the concrete in the walls essentially all confined. This confined state of the concrete imparts a much greater compressive strength to the concrete. For example, instead of the usual 5,000 p.s.i., the compressive strength may be in the order of 15,000 p.s.i.

The confined state also alleviates problems associated with shrinkage and creep, and so it becomes possible to increase the allowable membrane stress in compression to at least 2,500 p.s.i. This value gives an apparent safety factor of only two for 5,000 p.s.i. concrete, and less than two if stress concentrations, temperature, and creep effects were to be taken into account. However, with the proper strength ratio seen, the safety is actually greater and the safety factor will be more than sufficient at the ultimate failure state; because the amount of prestressing force, which probably will reduce with time, can never be greater than the amount that is first applied. Therefore, the membrane stress value may possibly be raised much higher to an allowable of perhaps 3,500 p.s.i.

The membrane stress factor, i.e., the ratio of membrane stress produced by prestressing to membrane stress produced by internal pressures, has usually been on the order of 1.1 or 1.15, as far as the design of nuclear containment vessels is concerned. This means that under a test pressure of more than 1.15 times the design internal pressure, the membrane pressure will be overcome by the internal pressure statically, and the vessel will crack.

Since there is no reason to expect in operation an accidental pressure buildup of 15% greater than the design pressure, which itself has included an allowance for higher-than-normal pressures, a load factor of 1.10 or 1.15 is believed to be reasonable and adequate also for a coal conversion PCPV. It can be argued that these PCPV merit a higher factor of safety than normally used for secondary nuclear containment vessels, which are rarely, if ever, subjected to actual internal pressures. In a manner of speaking, a higher factor of safety does in fact exist, considering the ductile nature of failure and the recovery capability of prestressed concrete, the reserve in the ultimate strength of tendon, and the usual presence of steel liner in the internal cavities and the added reinforcement which are not generally taken into account in the analysis of membrane stresses.

However, it should be noted that the load factor based on membrane stress calculations does not take into account the existence of much higher stresses at various local points in the vessel, nor the effect of temperature gradient, shrinkage, and creep. These additional stress conditions may require the factor to be increased to perhaps 1.25 to insure better behavior under working conditions.

There appears to be virtually no need for an upper limit for compressive stress when the present invention is used since the concrete is confined in three dimensions. Concrete is ductile in compression, especially when confined, and a localized high compressive stress may mean nothing more than a high local strain. When an extreme condition occurs, a redistriction of stresses would take place, bringing relief to this condition. With concrete confined in three dimensions, there is practically no way for concrete to fail even at a compressive stress much higher than its cylinder strength.

As stated above, controlled tensile "cracks" are permitted because the cracks do not diminish the capability of the structure to fulfill the purposes for which the vessel is designed, and the cracking or opening of the formed partings 79, relieves some tensile stresses, permitting higher pressures and temperatures to be confined.

Reinforced concrete subjected to tensile stresses will crack. Cracking is a natural phenomenon of concrete structures. In the PCPV of the invention, minor hairline cracks due to localized shrinkage or stresses may occur at the outer face. These minor cracks may penetrate from the outside into the thick wall to the depth of a few feet, but they are structurally harmless. However, these small cracks may be unattractive, and they enable access for intrusion of moisture which may cause possible corrosion and problems of freezing and thawing. These cracks can be dealty with by controlling the crack width and also by protecting the concrete surface with a grout or suitable cement or sealant. The width of such cracks in the vessel wall can be controlled to some extent by inclusion of a wire mesh 80 within the vessel wall 73, near the outer surface, as shown in FIG. 9. Such mesh may be placed at a depth of only about one inch from the surface, in segments extending between the formed separations 79, and is effective to control crack widths, thereby improving the appearance of the vessel exterior.

To those skilled in the art to which this invention relates many changes in construction and widely differing embodiments and applications of the invention will suggest themselves without departing from the spirit and scope of the invention. The disclosure and the description herein are purely illustrative and are not intended to be in any sense limiting.

We claim:

1. A prestressed concrete pressure vessel, comprising:

a very thick-walled concrete structure having an outer encompassing surface and a body, said body being shaped to provide cavity means in said concrete body for holding a fluid under pressure and conduits providing ingress, egress, and connections for said cavity means, fluid impermeable linings in and for said cavity means supported by said concrete body, a series of vertically spaced-apart annular horizontal tendon means embedded in said body adjacent to and spaced inwardly from said outer surface, for prestressing said body, each said horizontal tendon means comprising a plurality of coplanar radially spaced-apart tendons, a series of U-shaped vertical tendons spaced apart from each other around each cavity of said cavity means, each tendon thereof having two vertical portions on opposite sides of the adjacent cavity and joined by a curved bottom portion, accompanying post-tensioning means for each said tendon, and stress-relieving means for generating stress-relieving radially-extending cracks in radially outer portions of said body away from said cavity means, for enhancing the resistance of said body to high internal pressure and to stress due to internal temperatures.

2. The vessel of claim 1 wherein said stress-relieving means comprises a series of radially-extending, angularly-spaced partings formed in the vessel wall and extending from the outer surface partway into the vessel wall, said partings being spaced from said cavity means.

3. The vessel of claim 2, further including sections of wire mesh within the vessel wall, near the outer surface, extending between the formed partings to control the widths of minor surface cracks occurring between the partings due to localized stresses.

4. The vessel of claim 2, further including sealants applied to the surface of the concrete vessel, for controlling intrusion of moisture into minor surface cracks occurring between the formed partings due to localized stresses.

5. A prestressed concrete pressure vessel, comprising:
a very thick-walled concrete structure having an outer encompassing surface and a body,
said body being shaped to provide cavity means in said concrete body for holding a fluid under pressure and conduits providing ingress, egress, and connections for said cavity means,
fluid impermeable linings in and for said cavity means supported by said concrete body,
a series of vertically spaced-apart annular horizontal tendon means embedded in said body adjacent to and spaced inwardly from said outer surface, for prestressing said body, each said horizontal tendon means comprising a plurality of coplanar radially spaced-apart tendons,
a series of continuous U-shaped vertical tendons spaced apart from each other around said cavity means, each tendon thereof having two vertical portions on opposite sides of the adjacent cavity joined by a curved bottom portion, and
accompanying post-tensioning means for each said tendon,
whereby the U-shaped vertical tendons may be post-tensioned from the top only.

6. An integrated multiple-cavity prestressed pressure vessel, comprising:
a concrete structure having an outer encompassing surface and a body,
said body being shaped to provide a plurality of cavities in said concrete body for holding a fluid under pressure and conduits providing ingress, egress, and connections for said cavities,
fluid impermeable linings in and for said cavities supported by said concrete body, and
peripheral tendons for prestressing the body adjacent said outer surface for balancing the pressure exerted on said body toward the periphery by fluid under high pressure in said cavities, pressure exerted toward each other by the cavities being balanced partly at least, by the opposing forces set up in the cavities, and including a series of generally horizontally-encircling tendons embedded in said body near said surface, accompanying post-tensioning means therefor secured to said body on a series of levels of said pressure vessel, a series of continuous U-shaped generally vertically tendons spaced from each other and embedded in said body around each cavity, each U-shaped tendon having two vertical portions on opposite sides of the adjacent cavity, joined by a curved bottom portion, and
accompanying post-tensioning means secured to said body anchoring said vertical tendons.

7. The pressure vessel of claim 6 having a supplementary series of prestressing tendons extending through said body between adjacent cavities and post-tensioning means for said tendons secured to said body adjacent said surface, for prestressing the body between adjacent cavities and for opposing the high pressure exerted on the body by the fluid in the cavities.

8. The pressure vessel of claim 7 wherein said supplementary series of prestressing tendons are arched oppositely to facing and adjacent arcuate portions of said peripheral tendons.

9. A prestressed concrete pressure vessel, comprising:
a very thick-walled concrete structure having an outer encompassing surface and a body,
said body being shaped to provide cavity means in said concrete body for holding a fluid under pressure and conduits providing ingress, egress, and connections for said cavity means,
fluid impermeable linings in and for said cavity means supported by said concrete body,
a series of vertically spaced-apart annular horizontal tendon means embedded in said body adjacent to and spaced inwardly from said outer surface, for prestressing said body, each said horizontal tendon means comprising a plurality of coplanar radially spaced-apart tendons,
a series spaced generally vertical tendons embedded in said body,
accompanying post-tensioning means for each said tendon, and
stress-relieving means for generating stress-relieving radially-extending cracks in radially outer portions of said body away from said cavity means, for enhancing the resistance of said body to high internal pressure and to stress due to internal temperatures.

10. The vessel of claim 9 wherein said stress-relieving means comprises a series of radially-extending, angularly-spaced partings formed in the vessel wall and extending from the outer surface part way into the vessel wall, said partings being spaced from said cavity means.

11. The vessel of claim 10, further including sections of wire mesh within the vessel wall, near the outer surface, extending between the formed partings to control the widths of minor surface cracks occurring between the partings due to localized stresses.

12. The vessel of claim 10, further including sealants applied to the surface of the concrete vessel, for controlling intrusion of moisture into minor surface cracks occurring between the formed partings due to localized stresses.

* * * * *